United States Patent
Wesby

(10) Patent No.: US 7,548,307 B2
(45) Date of Patent: Jun. 16, 2009

(54) APPARATUS AND METHOD FOR WHEEL ALIGNMENT

(76) Inventor: Scott Matthew Wesby, 14323 Normal Ave., Riverdale, IL (US) 60827

( * ) Notice: Subject to any disclaimer, the term of this patent is extended or adjusted under 35 U.S.C. 154(b) by 0 days.

(21) Appl. No.: 11/847,319

(22) Filed: Aug. 29, 2007

(65) Prior Publication Data

US 2009/0059213 A1  Mar. 5, 2009

(51) Int. Cl.
*G01B 11/275* (2006.01)
(52) U.S. Cl. .................... 356/139.09; 356/155
(58) Field of Classification Search ............ 356/139.09, 356/155
See application file for complete search history.

(56) References Cited

U.S. PATENT DOCUMENTS

| | | | | |
|---|---|---|---|---|
| 4,444,496 A | * | 4/1984 | Dale, Jr. ..................... | 356/155 |
| 5,978,077 A | * | 11/1999 | Koerner et al. ......... | 356/139.09 |
| 6,134,792 A | * | 10/2000 | January ................... | 33/203.18 |
| 6,657,711 B1 | * | 12/2003 | Kitagawa et al. ............ | 356/155 |
| 2008/0037012 A1 | * | 2/2008 | Braghiroli ................... | 356/153 |

OTHER PUBLICATIONS

Earl Gillstrom, "DIY 928 Wheel Alignment Nov. 26, 2004", Google search: http://members.rennlist.com/captearlg/928alignwhydifshop. html, Jun. 25, 2007, 9 pages, (see attached PDF/DOC files).

\* cited by examiner

*Primary Examiner*—Isam Alsomiri

(57) ABSTRACT

A mounting fixture assembly allows the attachment of a laser light emitting device—in this case a laser level—used along with a light reception board to determine thrust, toe, and camber measurements of motor vehicles. The mounting fixture provides a means of surface mounting the laser device to the rims of the wheels of motor vehicles without the need for any physical clamping or attaching devices used at the rim, wheel, or tire of a vehicle in conjunction with a laser emitting device support fixture. The mounting fixture permits the surface mounting of the laser device to wheels having camber angles within a normal range of deviance (+/−10° approximately). The fixture assembly maintains surface contact of the laser device throughout the adjustment process. The fixture allows for the radial rotation of the light emitting device facilitating the determination of measurements used in the calculation of toe angles.

1 Claim, 12 Drawing Sheets

Application of wheel apparatus with optional carriage employed - front view.

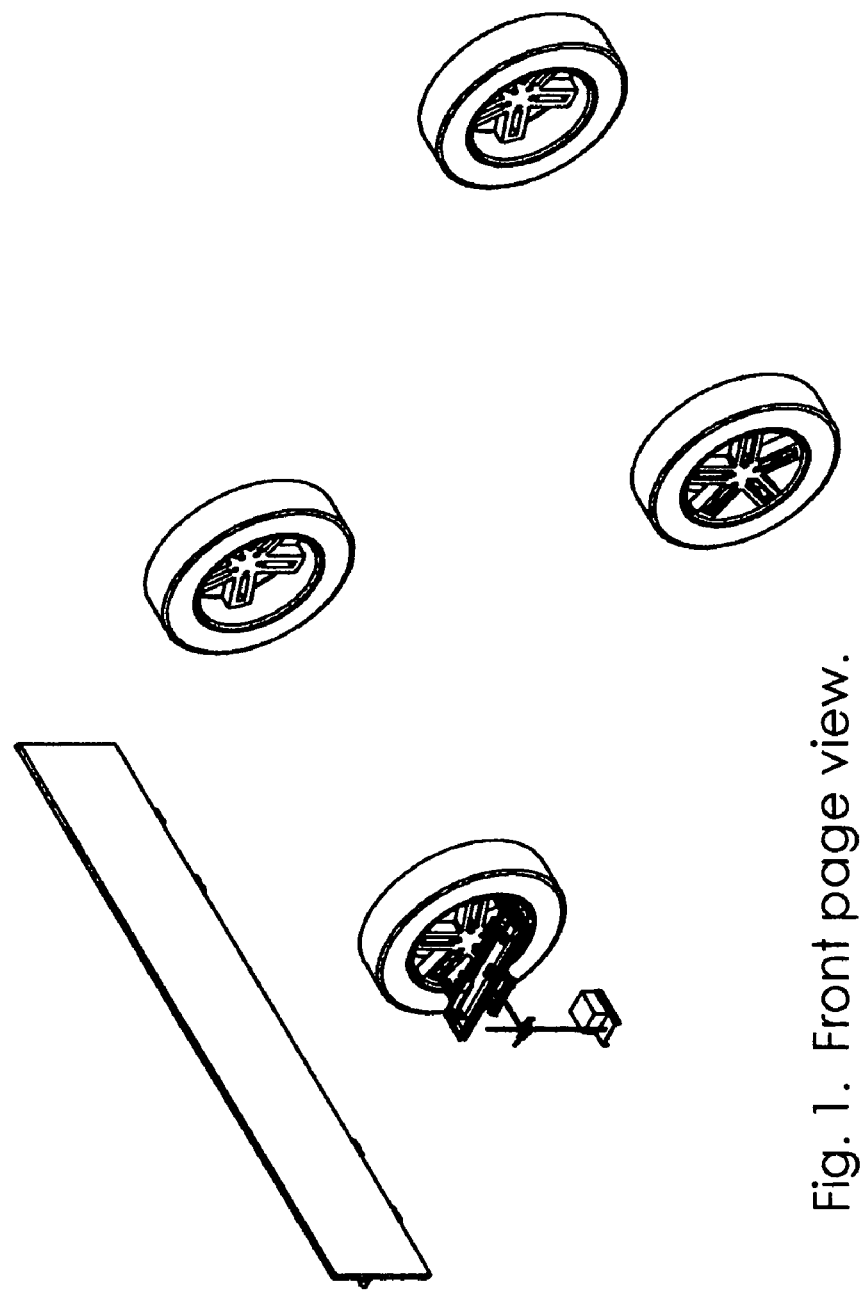
Fig. 1. Front page view.

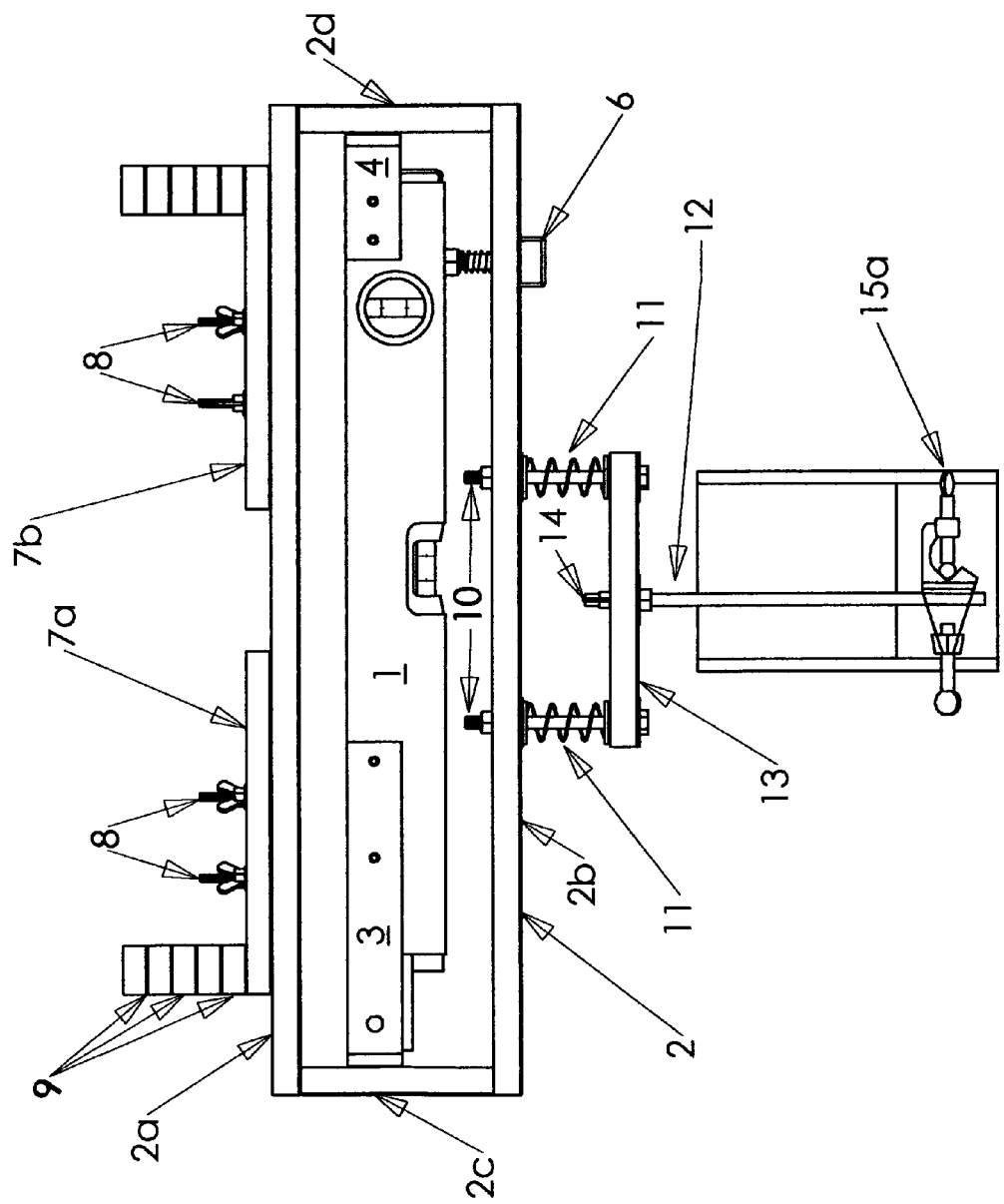
Fig. 2. Wheel alignment apparatus without carriage assembly - top view.

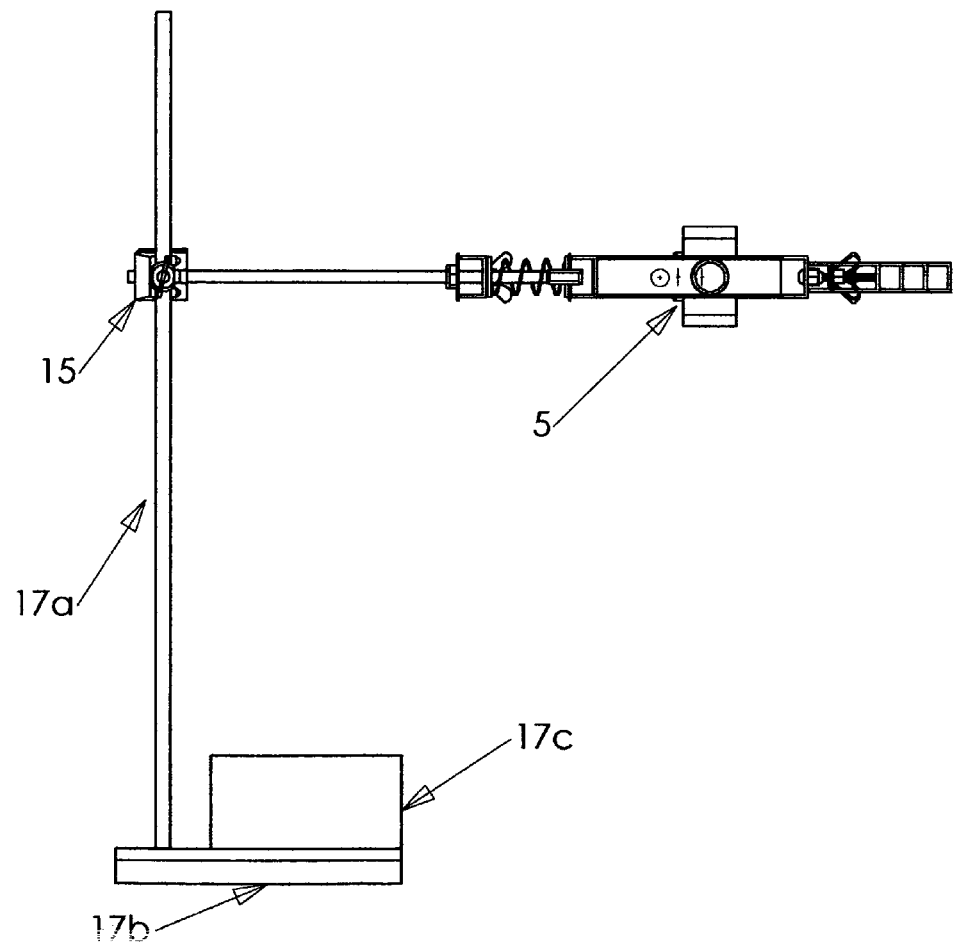
Fig. 3. Wheel apparatus without carriage assembly - side view.

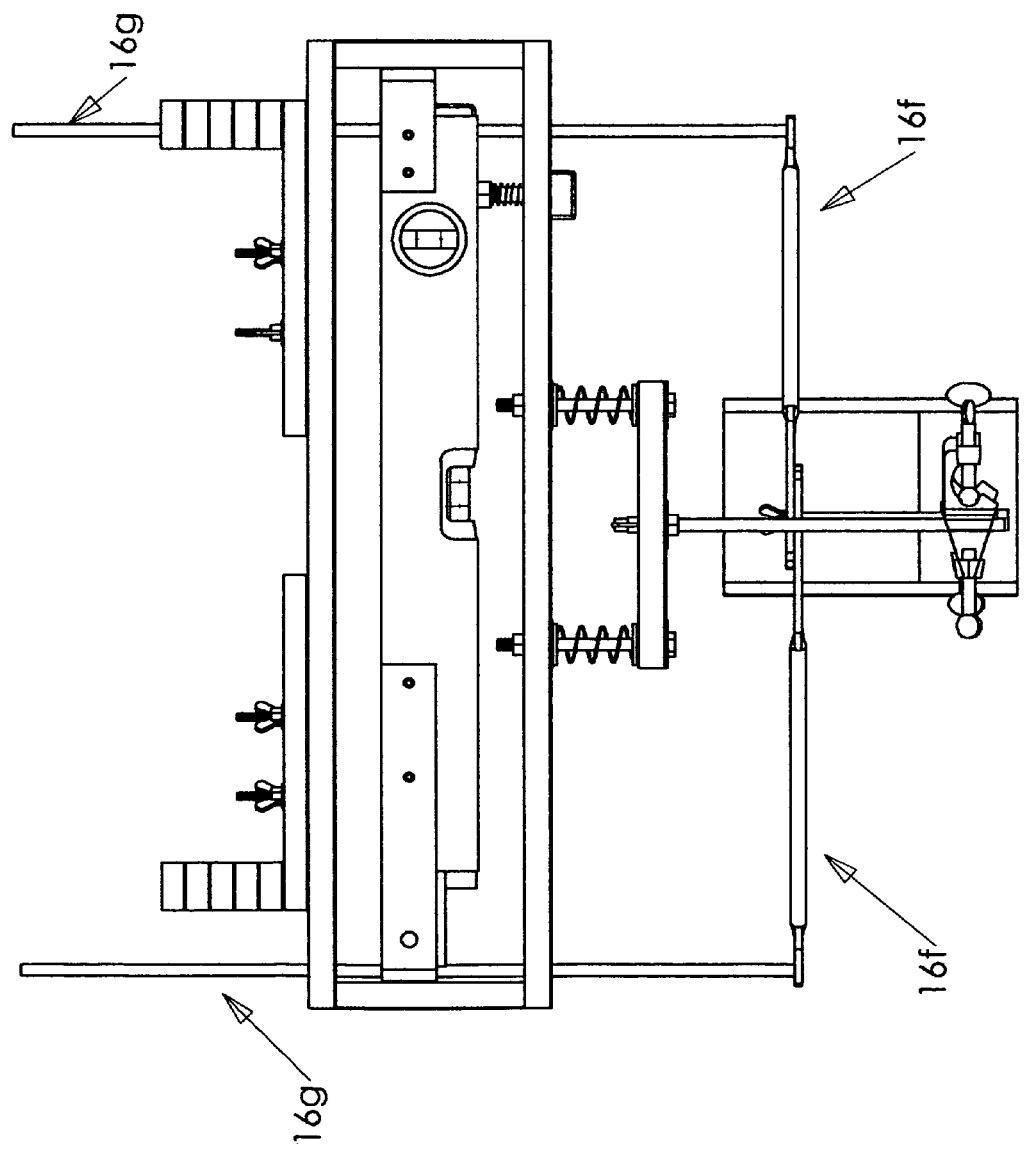
Fig. 4. Wheel apparatus with optional carriage assembly - top view.

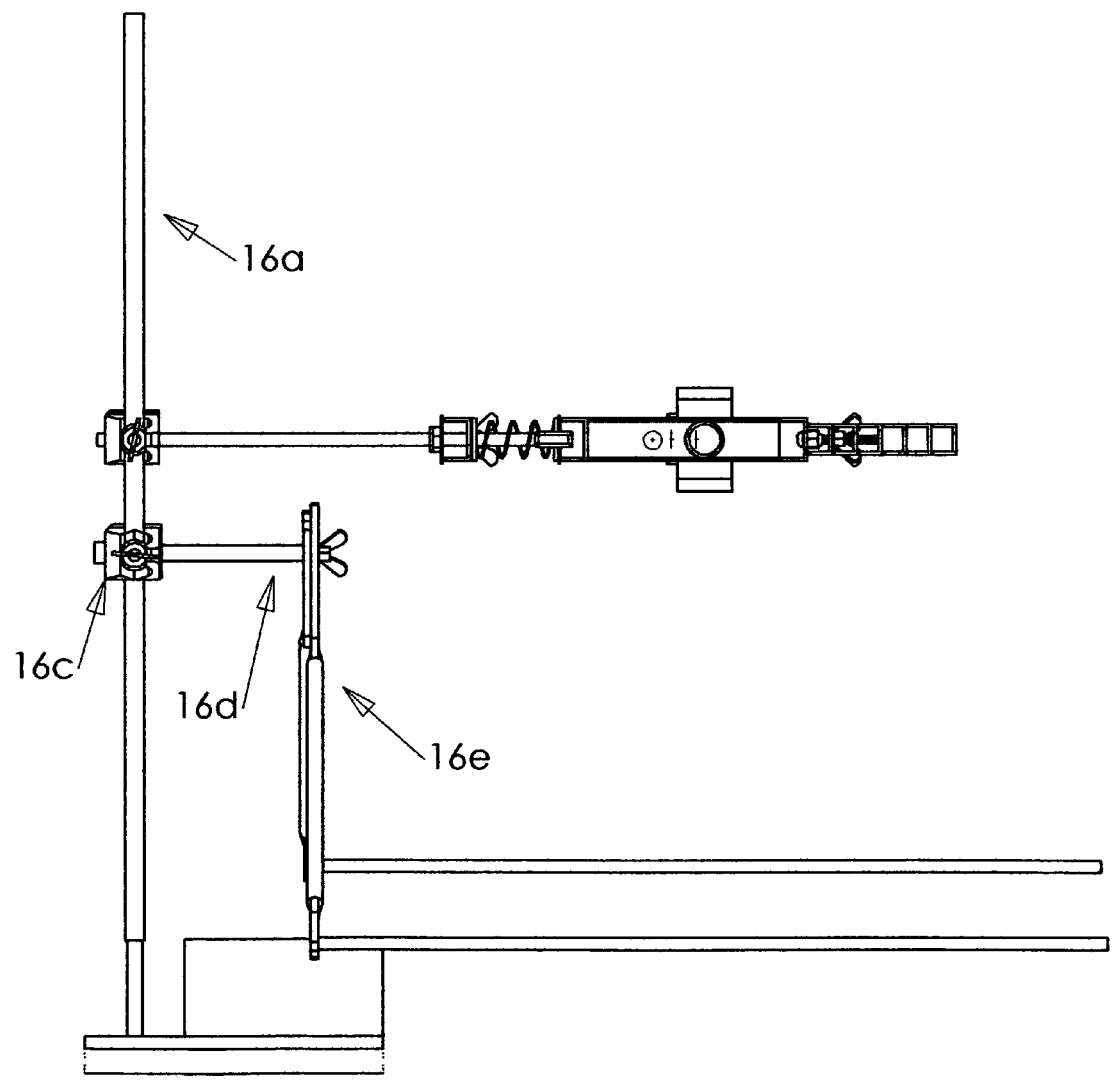
Fig. 5. Wheel apparratus with optional carriage assembly - side view.

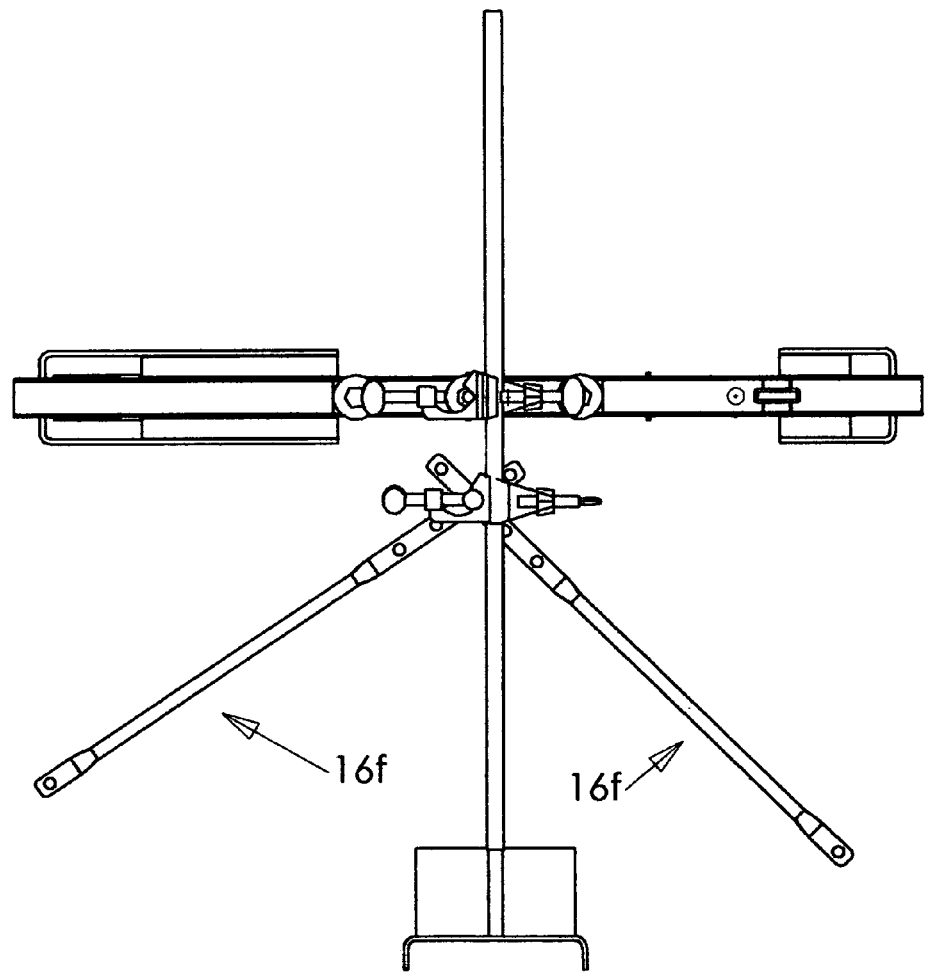
Fig. 6. Wheel apparatus with optional carriage assembly - front view

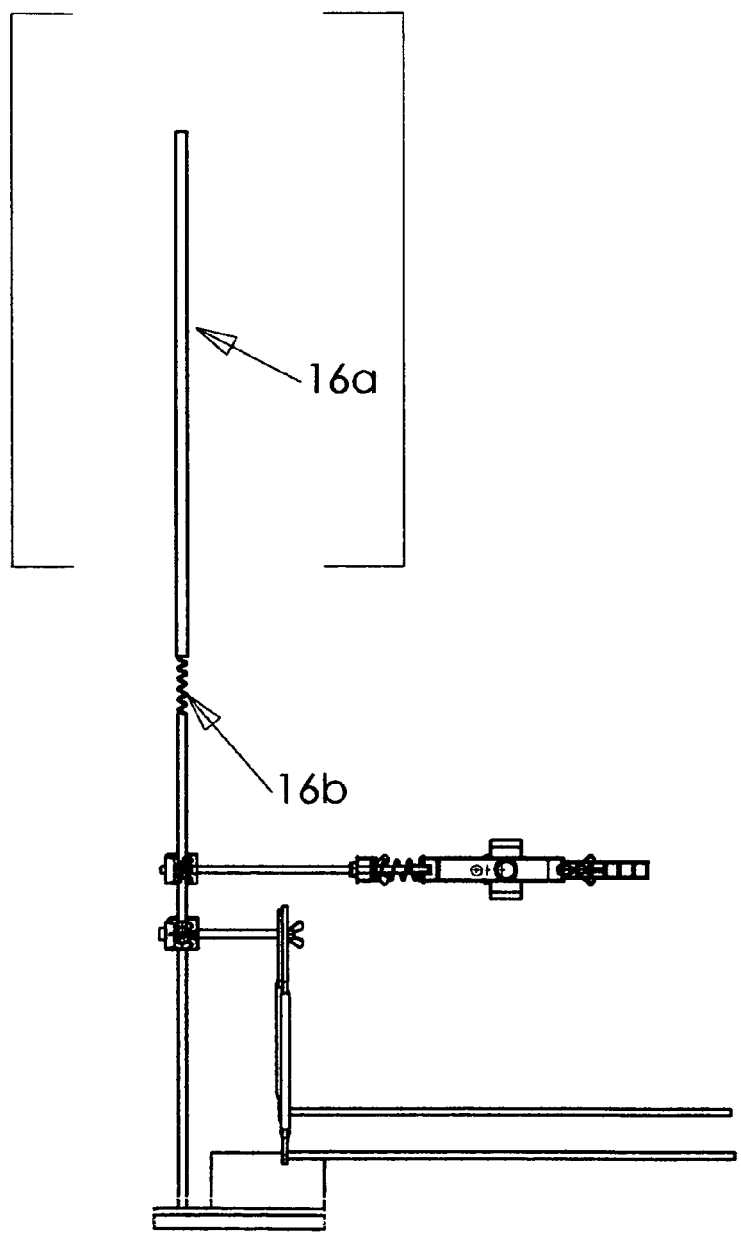
Fig. 7. Wheel apparatus with optional sliding vertical tube - exploded right view

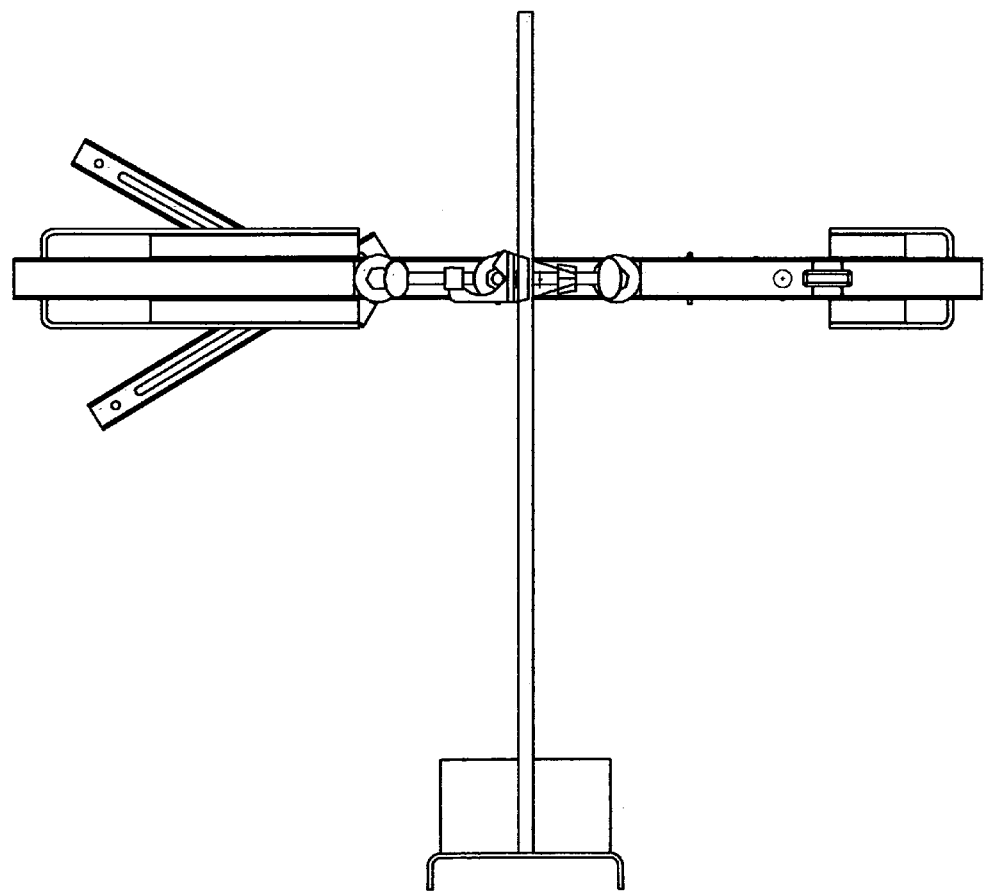
Fig. 8. Wheel apparatus with extra contact arm - front view

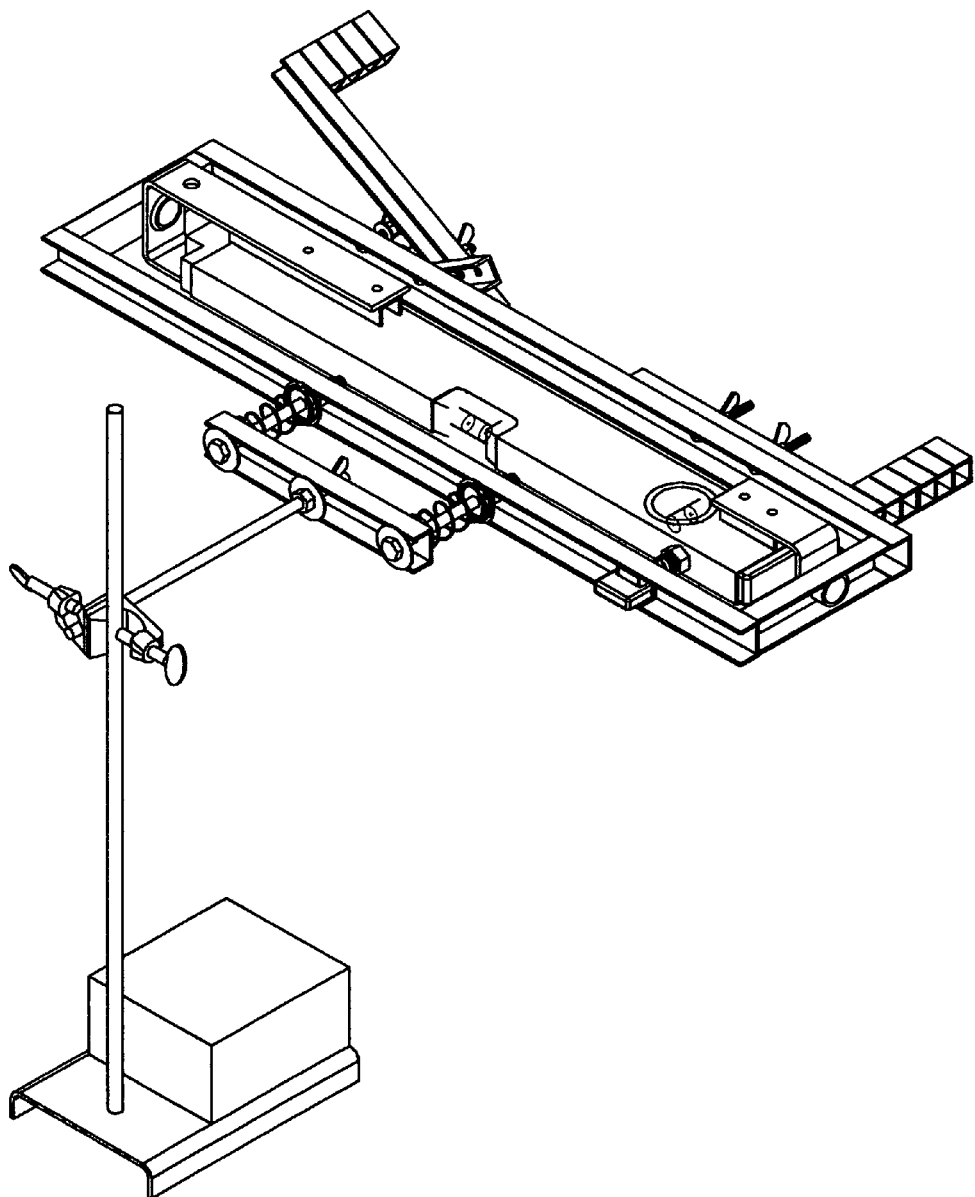
Fig. 9. Wheel apparatus with extra contact arm - isometric view

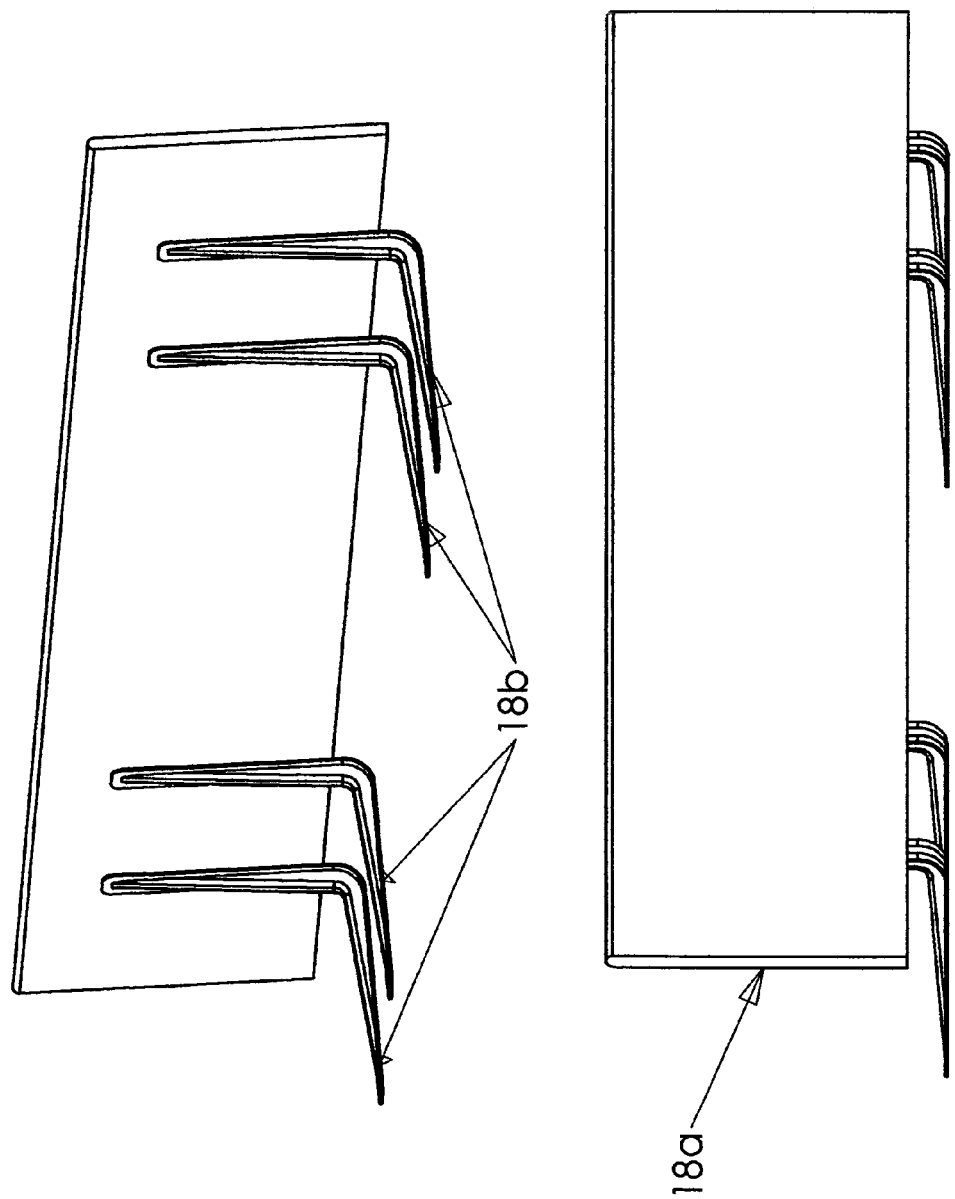

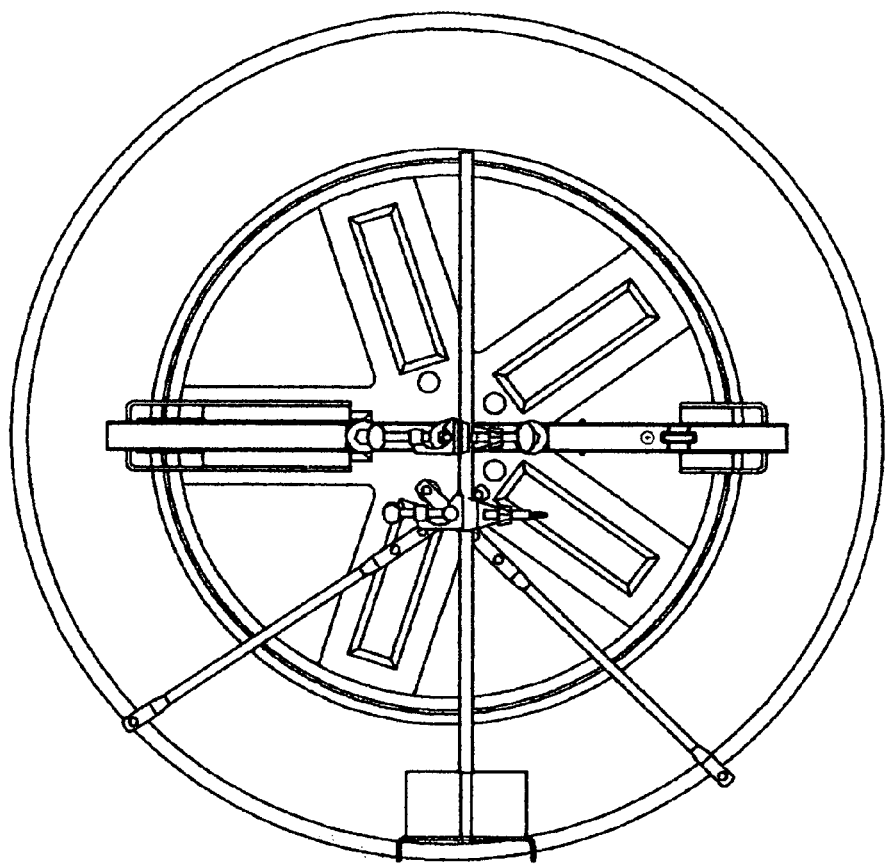
Fig. 11. Application of wheel apparatus with optional carriage employed - front view.

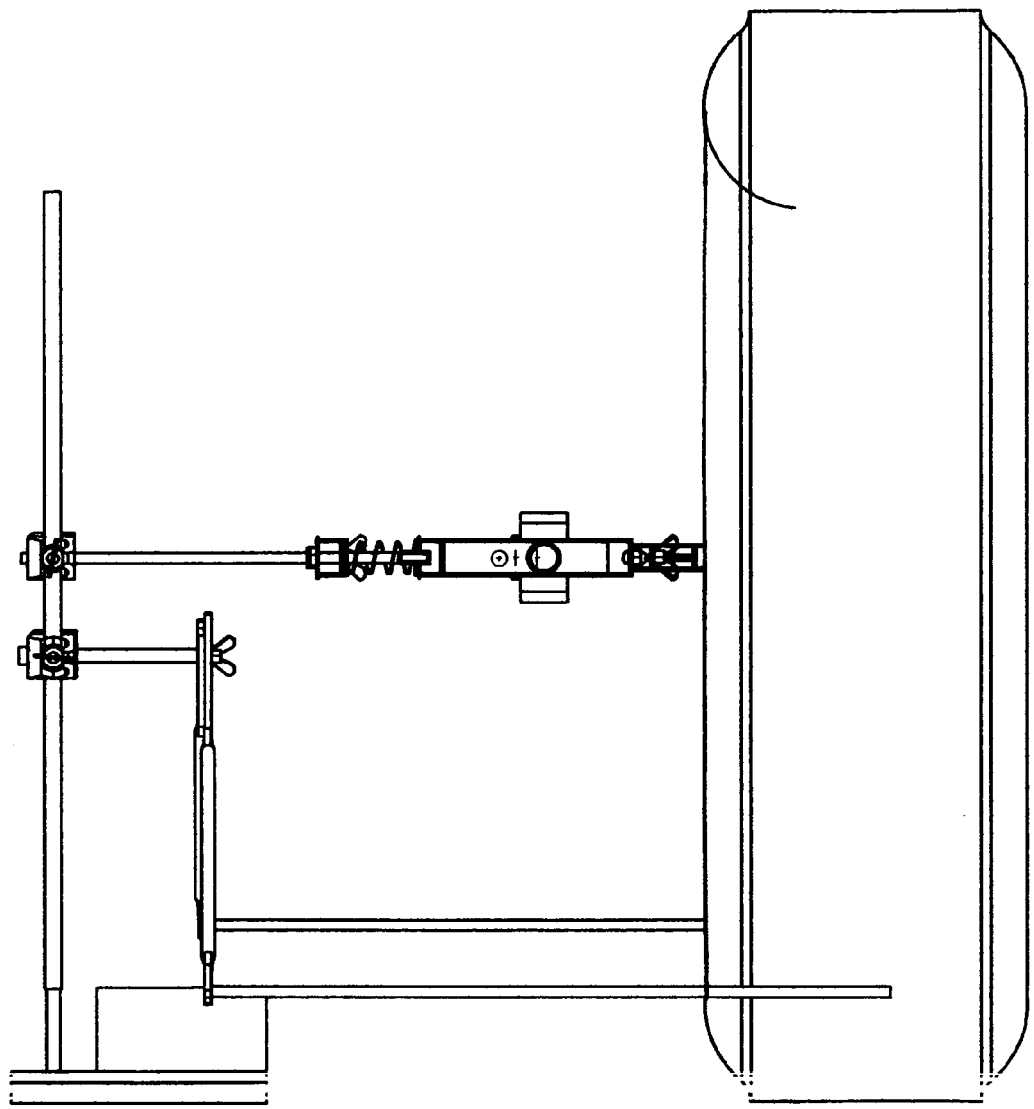
Fig. 12. Application of apparatus with optional carriage employed - side view

APPARATUS AND METHOD FOR WHEEL ALIGNMENT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND AND CIRCUMSTANCES OF THE INVENTION

A majority of the alignment devices and machines are cost prohibitive for the use of the everyday "do-it yourselfer." The electromechanical and mechanical devices developed, are for the professional repair shop and/or vehicle manufacturer. These devices incorporate computers, alignment racks and frames, with or without highly involved and complexly designed emitting and receiving devices with associated circuitry. Even some of the devices intended for the "do-it yourselfer" have turned out to be expensive, not easily used, and/or not encompassing in their capabilities. This invention solves all of these problems.

BRIEF SUMMARY OF THE INVENTION

The apparatus provides a low cost way of combining inexpensive components—a laser level; aluminum channel, piping, and flat stock; supporting stand with its related components; and a light reception board; to permit the manufacture of a device and method for determining thrust, toe, and camber angles that the "do-it yourselfer" can afford and use. The use of this device and method is simple—it does not require any fastening or clamping of the device to wheels. It is accurate—it uses the precision of a laser light emitting device—the laser level, along with accurate measurements to produce dependable results. It has universal applications—it can be used on any wheel of any motor vehicle. It is used to calculate thrust angles—an application lacking in many lower cost alignment devices and of particular importance.

BRIEF DESCRIPTION OF THE SEVERAL VIEWS OF THE DRAWING

FIG. 1 shows the front page view, which consists of the application of the wheel apparatus in relation to the other wheels and the light reception board.

FIG. 2 shows the top view of the wheel apparatus without the optional carriage assembly.

FIG. 3 shows the side view of the said apparatus without the carriage assembly.

FIG. 4 shows the top view of the said apparatus with the carriage assembly.

FIG. 5 shows the side view of the said apparatus with the carriage assembly.

FIG. 6 shows the front view of the said apparatus with the carriage assembly.

FIG. 7 shows an exploded; right view of the said apparatus with the carriage assembly.

FIG. 8 shows the front view of the said apparatus with an extra contact arm.

FIG. 9 shows an isometric view of the said apparatus with an extra contact arm.

FIG. 10 show the back and the front of the light reception board.

FIG. 11 shows the front view of the application of the wheel apparatus with the optional carriage assembly employed.

FIG. 12 shows the back view of the application of the wheel apparatus with the optional carriage assembly employed.

DETAILED DESCRIPTION OF THE INVENTION

The complete wheel apparatus is comprised of a laser level (1) mounted in a frame (2) consisting of an inner longitudinal member (2a), outer longitudinal member (2b), laser end transverse member (2c), and non-laser end transverse member (2d). Frame members are welded together at right angles to each other. The laser level is mounted in the frame by means of mounting brackets—at the laser end (3), and the non-laser end (4) of the laser level. The mounting bracket assemblies include tubular aluminum (5), FIG. 3 welded to the bases of the mounting brackets and serve as pivots by which the laser level can rotate relative to the frame of the mounting fixture assembly. The attached mounting brackets and laser level are installed into the frame by slipping the mounting bracket pivots (5) into machined holes on both transverse members. This assembly is referred as the mounting assembly. The location of the centers of the holes and pivots are in line with the emitted laser beam. A position locating pin assembly (6) is attached to the outer longitudinal member near the non-laser end of the frame. This serves as a locking device to prevent laser level rotation during the alignment process. It also allows the operator of the device to rotate the laser level, which is also used in the alignment process. Attached to the inner longitudinal member (2a) of the frame (2) are two sliding contact arms—one at the laser end (7a) and one at the non-laser end (7b) of the frame. Each contact arm has a slotted hole centered lengthwise that permits the arm to be slid along the contacting surface of the inner frame, which has two protruding studs (8) attached at each end of the inner frame member to guide the longitudinal movement of each contact arm. Attached to the outermost end of each of the contact arms are spacer/contact pads (9), which are mounted one on top of another with a centrally located hole drilled in each. A through bolt attaches the stack of pads to each contact arm (7). Protruding through the outer frame member (2b) are two rigidly attached spring bolts (10) that serve as both guides and locators for the two pressure bar springs (11) and as pivots for relative movement between the mounting assembly and horizontal support rod (12). The pressure bar springs (11) bear against both the outer frame member (2b) and the pressure bar (13). The spring bolts (11) protrude through holes at each end of the pressure bar (13), which allow for the axial movement of the pressure bar (13) with respect to the spring bolts (10). The oversized holes of the pressure bar for the spring bolts also allow for angular movement of the mounting assembly with respect to the axis of the horizontal support rod (12). These components: spring bolts (10), pressure bar springs (11) and the pressure bar (13), collectively, are referred as the pressure assembly. This angular movement allows for the maintenance of the surface contact between the contact pads of the mounting assembly and the rim of the wheel that the wheel apparatus is positioned against. The horizontal support rod (12) attaches to the pressure bar at a centrally located hole lengthwise on the pressure bar (13) by means of a wing nut (14) that permits the fixing of the mounting assembly to the horizontal support rod (12) once the mounting assembly is leveled. The right angle clamp (15) allows for the vertical positioning of the mounting assembly to the approximate center height of the wheel the apparatus is being applied to. The right angle clamp (15) also allows for the rotational positioning of the mounting assembly with the respect to the stand's vertical rod (17a). A thumb screw (15a) threaded through the right angle clamp secures the clamp itself to the stand's vertical rod (17a). The stand's vertical rod threads into the stand's base (17b). The stand's base (17b) includes an attached steel plate (17c) of sufficient weight to prohibit any movement of the base relative to the floor while the mounting assembly is positioned against the rim of the wheel the apparatus is being applied to. The optional sliding vertical support tube and carriage assembly (16), FIG. 4 & 5 includes the sliding vertical support tube (16a), the sliding vertical support tube compression spring (16b), the carriage right angle clamp (16c), the carriage right angle clamp shoulder bolt (16d) and nut (16e), the carriage connecting rods (161), and the carriage rods (16g). When utilized, the right angle clamp (15) and the components attached to it are removed from the vertical support rod (17a). The sliding vertical support tube compression spring (16b) is inserted into the open end of the vertical support tube (16a), which is then slipped over the vertical support rod (17a). The carriage right angle clamp (16c) is slipped over the vertical support tube (16a) and positioned a few inches above the bottom of the open end of the vertical support tube (16b) by the tightening the clamp's mating thumb screw. The carriage right angle clamp shoulder bolt (16d) is secured in the carriage right angle clamp (16c) pointing in the direction of the stand's base (17b) by the clamp's other thumb screw. The non-threaded holes at one end of each of the carriage connecting rods (16f) are slipped over the shoulder bolt (16d)—one over the other. The shoulder bolt nut (16e) is then threaded onto the shoulder bolt (16d). The carriage rods (16g) are threaded into the threaded ends of each of the connecting rods (16f) so that each rod points in the same direction as the shoulder bolt (16d). The initial orientation of the connecting rods (16f) is one in which each rod points down and away from the vertical sliding tube (16a), forming approximately equal angles with the tube (16a). These angles are adjusted as well as the vertical position of the carriage right angle clamp (16c) in order to allow the carriage rods (16g) to slip under the tire on either side of the tire's contact area when the wheel apparatus is positioned against the wheel being checked as well as after the vertical sliding tube (16a) has been moved several inches down the vertical support rod (17a) compressing the support tube compression spring (16b). The carriage right angle clamp (16c) is then secured to the vertical sliding tube (16a) and then the shoulder bolt nut (16e) is tightened after the correct positioning of the connecting rods (16f).

The light reception board (18a), FIG. 10 is of such material manufactured as a rectangular straight, rigid plane with a white surface or a rectangular plane material with a white surface that can be made straight and rigid by the addition of stiffeners (e.g. channels, beams, bars, etc.), that allows for the marking of the location of the emitted laser beam. The light reception board (18a) is approximately eight feet long and sixteen inches wide; the thickness depends on the material used. The light reception board (18a) is positioned horizontally and supported vertically lengthwise two inches above the floor by two right angle brackets (18b) at each end of the light reception board at a distance of one to two feet and one and a half to three feet respectively from each end of the board. One leg of each of the right angle brackets (18b) are attached to the opposite side of the white surface of the light reception board at an angle of 90° to a lengthwise edge of the light reception board (18a). The light reception board assembly (18) consists of the board (18a) and the right angle brackets (18b).

Other materials required in the method and process include a drywall square, plumb bob, level, tape measure, and scientific calculator.

The best use of the apparatus is accomplished during the method of determining the wheel alignment angles of thrust, toe, and camber, which is described as follows. The vehicle, for which the wheel alignment angles are to be determined, is driven in a straight direction onto a surface that is or has been leveled in the transverse direction to the length of the car. The surface should be as level as possible in the longitudinal direction to the length of the car, but does not have to be made level if the slope of the surface is minimal (e.g. ¼ inch or less per three longitudinal feet). The rear wheels are chocked so as to prohibit longitudinal movement of the vehicle if it is raised at one of the front wheels. Two symmetrical points to the lengthwise center line of the vehicle's underside chassis are chosen and a plumb line is dropped to the floor from each of the points, where these locations are marked. A straight edge protruding out from each side of the vehicle is aligned with each of these marks in the transverse direction to the length of the car. With the use of the drywall square, a randomly chosen perpendicular length is chosen that places the light reception board at this length from the straight edge at both ends of the light reception board, but a length that positions the light reception board for sufficient space in front of the vehicle for floor jack usage at the front end of the vehicle. The light reception board is secured at this location by means of weights placed upon the unattached legs of the right angle brackets. The wheel apparatus is positioned at either the right rear wheel or the left rear wheel by first depressing the sliding vertical support tube and carriage assembly (16) and then moving the whole wheel apparatus assembly towards the wheel while slipping the carriage rods (16g) under the tire. The axis of the horizontal support rod (12) is then centered approximately at the center of the wheel so that the axis of the horizontal support rod (12) and the axis of the wheel are approximately collinear. The emitted laser light beam in the mounting assembly is leveled at this point by rotating the frame about the horizontal support rod (12) until level and then is secured at that position by tightening the support rod wing nut (12a). Each contact arm (7) is slid inward or outward at an approximately equal distance from the approximate longitudinal center of the level (1) until a distance is achieved that allows the flat surfaces of the contact pads (9) to contact the outer circumference of the rim without impedance and then is secured by the contact arm wing nuts (8a). The wheel apparatus is positioned inwardly towards the wheel so that both contact pads (9) contact the outer circumference of the rim without impedance. The wheel apparatus is further positioned inwardly until the pressure bar springs (11) are compressed to approximately one half their uncompressed lengths. A beam deflector lens is positioned across the emitted beam according to which side of the vehicle the wheel apparatus is being applied to. The laser beam is turned on and the spot where the beam strikes the light reception board (18a) is marked. The position locating pin (6a) is unlocked and the laser is rotated about the mounting bracket pivots (5) until level, at which point the floor is marked at the spot where the beam strikes the floor. The level is locked back in position with the position locating pin (6a). The drywall square is placed on the floor with its shorter arm against the two right angle brackets at the end of the light reception board (18a) that corresponds to the side of the car the wheel apparatus is on, and with its longer arm pointing towards the marked floor. A tape measure is placed along side the longer arm of the drywall square. The position of the drywall square is adjusted laterally along the length of the light reception board (18a) while maintaining contact between the shorter arm of the drywall square and the two right angle brackets (18b). The tape measure is placed along side the longer arm again and this is repeated until an edge of the tape measure aligns with the mark on the floor. The distance from the light reception board (18a) to the marked floor is recorded. From the point where the edge of the tape measure intersects the plane of the light reception board (18a), a plumb line is drawn or marked either with the use of the plumb bob or a level on the light reception board (18a). The horizontal distance from this line to the previously marked point on the light reception board (18a) is measured. Using the arctan function on a scientific calculator, the rear toe angle of the wheel at which the wheel apparatus is located is computed. The rear toe angle at this wheel can be adjusted at this time if possible and required. The preceding procedure is repeated at the other rear wheel opposite the one just completed. The angle measurements are averaged to calculate the thrust angle of the vehicle. The wheel apparatus is relocated and repositioned as previously described to one of the front steering wheels. The camber of this wheel can be measured as follows. With the wheel apparatus correctly positioned at this front wheel, the laser beam is turned on, but the filter over the emitter is positioned on the laser level to produce a line which is projected onto the light reception board (18a). At the projected line, an arbitrary point is chosen on the line and using a level, a horizontal line is drawn from it with a convenient length (e.g. 2 inches). At the end of this line, a vertical line is drawn until it strikes the projected line. Using the arctan function on a scientific calculator, the camber of this wheel is computed and can be adjusted at this time if necessary. The toe angle at this wheel can be determined as previously described and can be adjusted according to the computed thrust angle. During the adjustment procedure, the wheel is lifted by a jack under the lower control arm. The tire is lifted an inch or two off the floor, and while it is being lifted the optional sliding vertical rod support (16a) rises accordingly. At the same time, the compressed pressure bar springs (11) extend if necessary, compensating for the lift of the wheel and maintaining the contact of the contact pads (9) at the rim of the wheel. The wheel is lowered and the contact position and level of the mounting assembly is checked and adjusted if necessary. The toe angle is checked as before and the proceeding procedure is repeated until the correct toe angle is achieved. The same procedure is performed on the opposite front wheel.

GENERAL FIELD OF THE INVENTION

This invention relates to the general area of wheel alignment methods and devices. In particular, this invention relates to the physical apparatuses used to mount emitting devices to the wheels of motor vehicles and the corresponding method of measuring the alignment angles of thrust, toe, and camber.

What is claimed is:

1. A wheel alignment mounting fixture assembly provides a means of surface mounting a laser light emitting device to the rims of the wheels of motor vehicles without any physical clamping and attaching devices used at the rim, wheel, and tire of a vehicle; maintains the surface contact of said laser light emitting device throughout a wheel alignment adjustment process; allows for a radial rotation of said laser light emitting device that facilitates the calculation of the wheel alignment angles of toe, camber, and thrust when used in conjunction with a laser light reception board assembly placed at a determined distance in front of the vehicle; all of which comprises:

a mounting assembly that provides the means for mounting said laser light emitting device to it; that provides a bearing surface for adjustable sliding contact arms and their pads, whereby the outer rims of various wheel diameters can be reached and surface mated with said contact pads; that provides a connection location for pressure components of a pressure assembly; that provides the means for rotating the said laser light emitting device about an emitted focused narrow laser beam with respect to said mounting assembly; and the said laser light emitting device that emits said focused narrow beam of laser light parallel to the planar surface formed by the rim of the wheel the mounting assembly is applied to; that emits a focused narrow beam of light perpendicular to said beam of light; that emits a narrow line of laser light parallel to said planar surface; that provides the means to determine when said emitted beam of light is level; that provides the means to determine when said perpendicular beam of light is plumb; and said pressure assembly not attached, clamped, or suspended to the wheel, tire, or rim said mounting assembly is applied to, that provides the means for supplying the force necessary to apply said mounting assembly to the rims of wheels so that said contact pads are surface mated with the rim surface allowing for a normal range of camber ($\pm 10°$) of the wheel said mounting assembly is applied to; that also provides the means for said mounting assembly to pivot vertically in a limited fashion about a reaction member of the said pressure assembly, which reacts against the opposing force applied to the said mounting assembly; also providing a means for the leveling of the emitted laser light beam about a horizontal support attached to the said reaction member; and a support stand assembly that provides the means for mounting said horizontal support to a sliding vertical support, that also provides the means for a vertical positioning of said mounting assembly; that provides the means for automatic vertical position compensation of said mounting assembly during wheel lift by the use of a carriage assembly whereby said mounting assembly contact with the rim is maintained; also providing the means to support all of said components above the floor by a base stationed on the floor; and said light reception board assembly that provides a reflective surface for the emitted laser light beam to strike and be located whereby the wheel alignment angles of toe, camber, and thrust are computable.

* * * * *